July 19, 1927.
C. N. BERGMANN
1,636,208
RECEPTACLE DEPOSITING MECHANISM
Filed Sept. 29, 1923   3 Sheets-Sheet 1
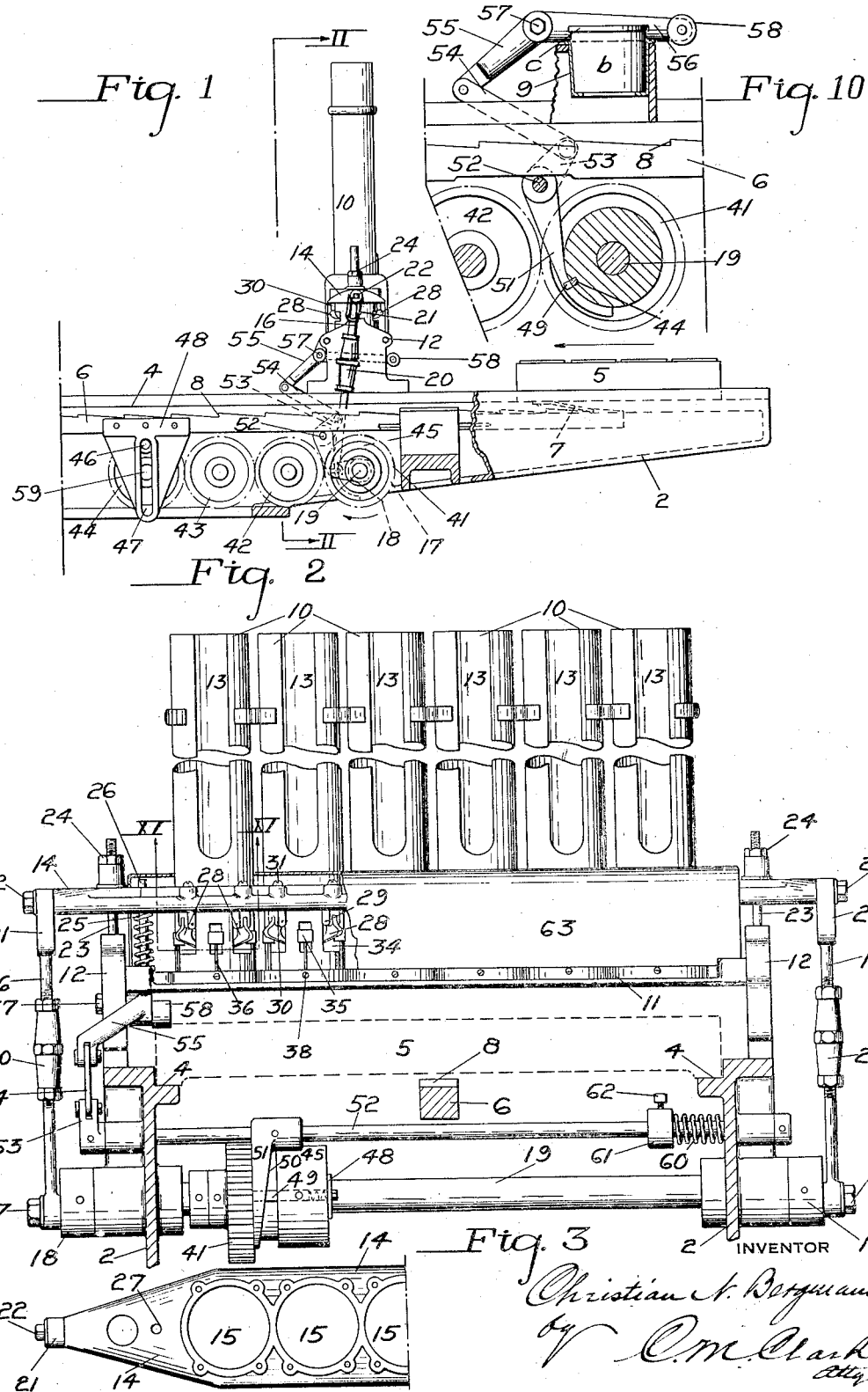
INVENTOR
Christian N. Bergmann
by C. M. Clarke
Atty July 19, 1927.
C. N. BERGMANN
1,636,208
RECEPTACLE DEPOSITING MECHANISM
Filed Sept. 29, 1923   3 Sheets-Sheet 2
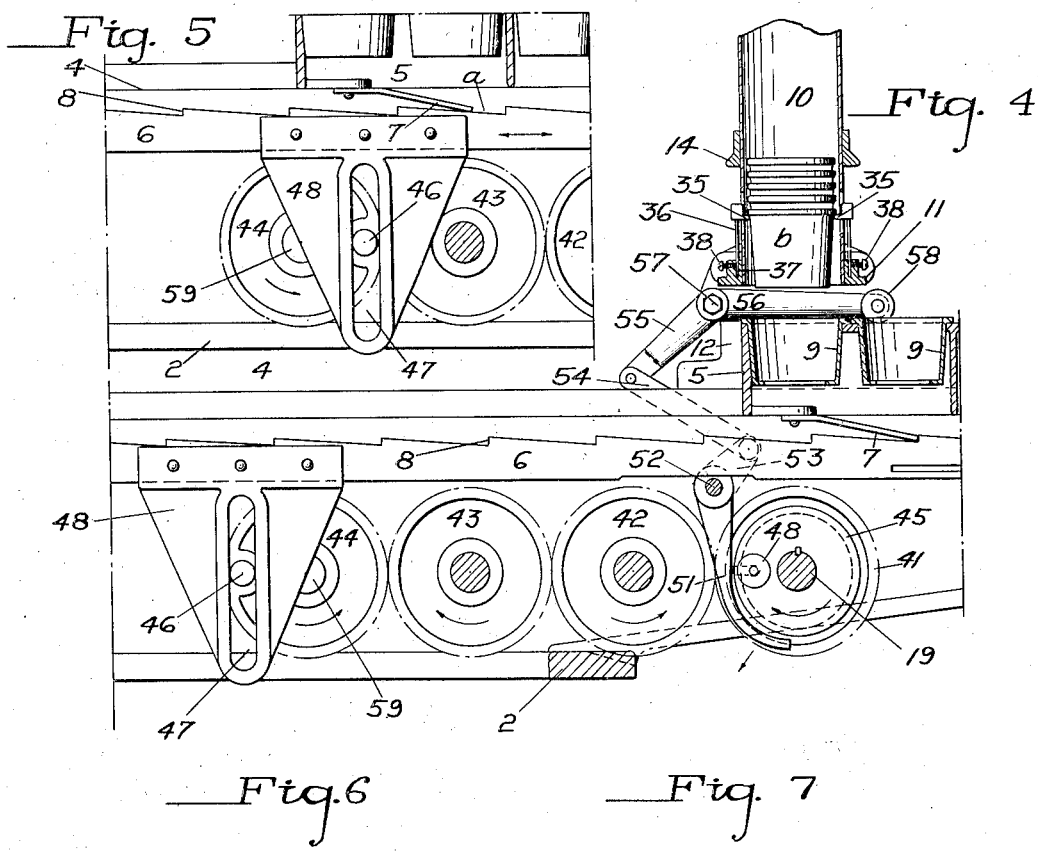
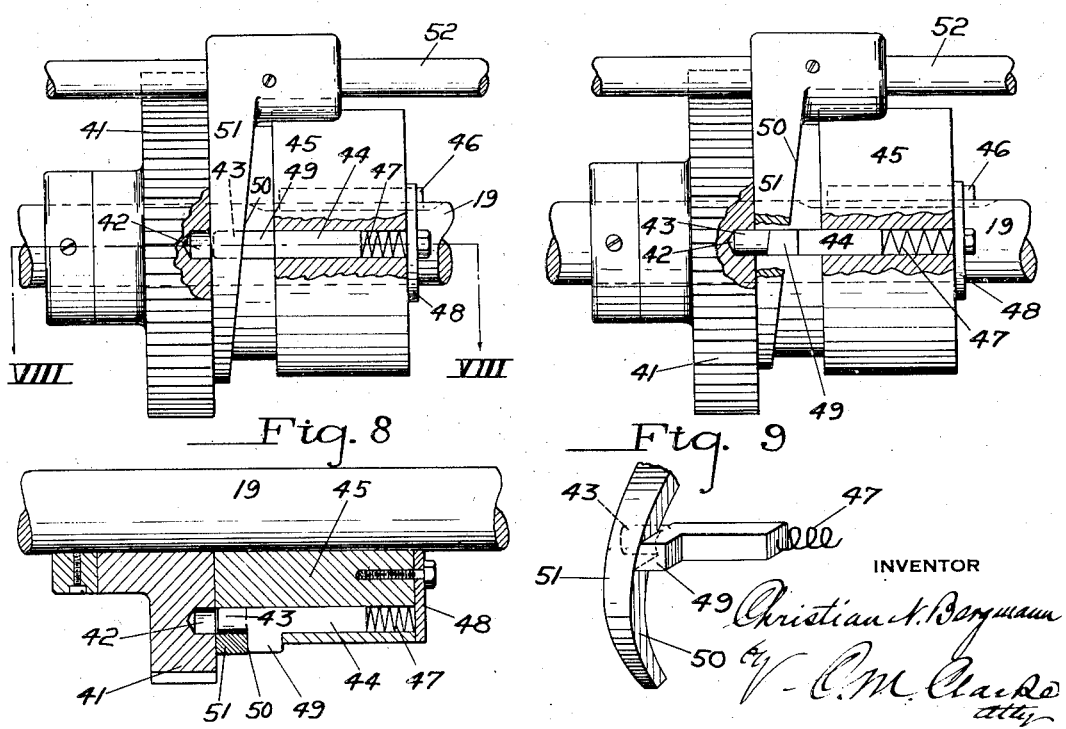
INVENTOR
Christian N. Bergmann
by C. M. Clarke
Atty July 19, 1927.
C. N. BERGMANN
1,636,208
RECEPTACLE DEPOSITING MECHANISM
Filed Sept. 29, 1923    3 Sheets-Sheet 3
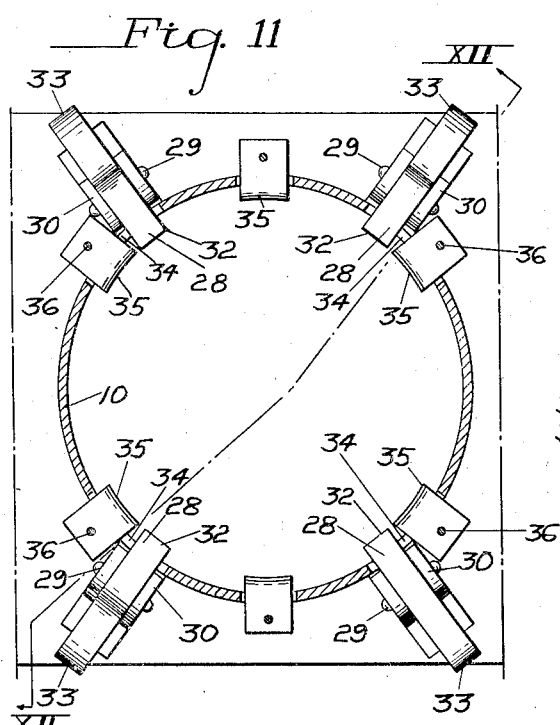
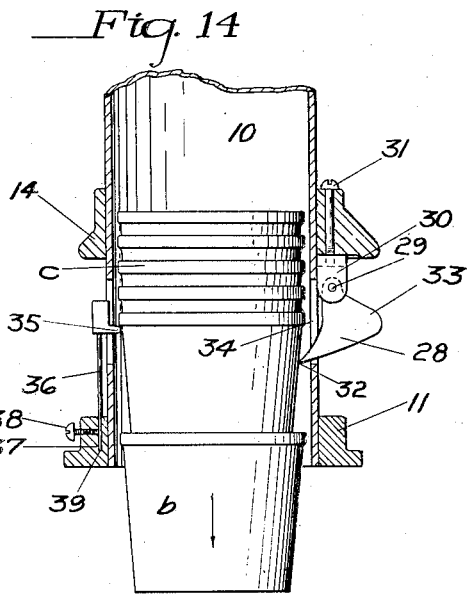
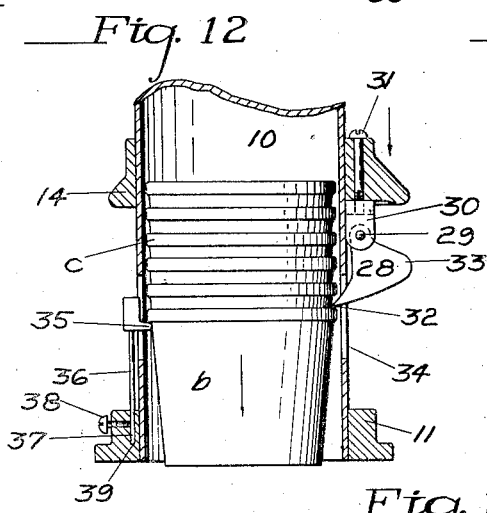
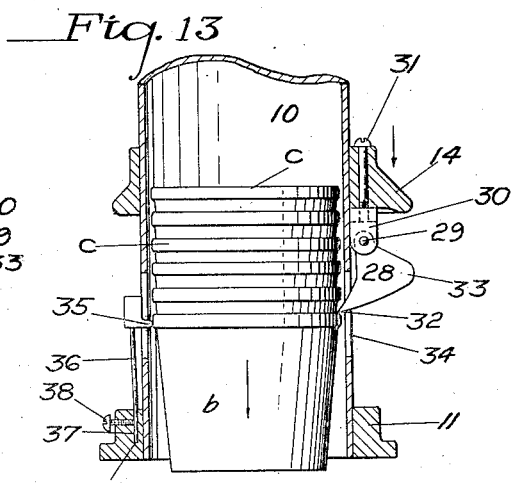
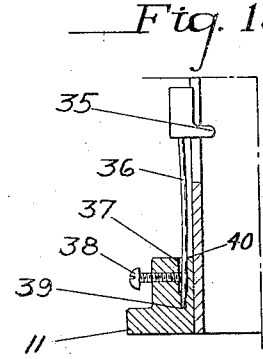
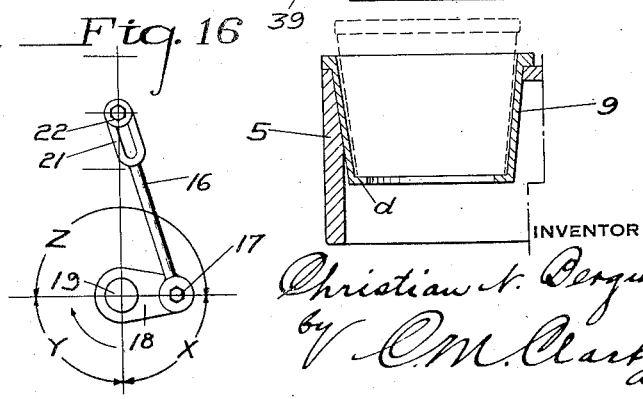
INVENTOR
Christian N. Bergmann
by C. M. Clarke
Atty Patented July 19, 1927.

1,636,208

UNITED STATES PATENT OFFICE.

CHRISTIAN N. BERGMANN, OF PITTSBURGH, PENNSYLVANIA, ASSIGNOR TO BERGMANN PACKAGING MACHINE COMPANY, OF PITTSBURGH, PENNSYLVANIA, A CORPORATION OF DELAWARE.

RECEPTACLE-DEPOSITING MECHANISM.

Application filed September 29, 1923. Serial No. 665,604.

My invention refers to improvements in machines for filling and closing receptacles for containing commodities of different kinds.

The object in view is to provide means for automatically actuating receptacle or cup depositing mechanism so as to place individual receptacles within a holder or carrier which is subject to engagement and disengagement of clutch mechanism, which itself is controlled or subject to operation by the receptacle carrier. The depositing mechanism forms a portion of a complete machine for the purpose of bringing one or a series of such receptacles or cups successively into registering position with filling mechanism by which predetermined unitary amounts of material, as ice cream or other suitable commodity, are charged into the receptacles, which are then capped or closed for vending or storage.

The present invention is an improvement on that type of machine forming the subject matter of my prior application filed January 17, 1923, Serial No. 613,235, for unit measuring machine.

In such machine, one or more trays are intermittently moved along a trackway, containing spaced transverse rows of cups or cartons, each row being brought into registering position with the filling or charging mechanism, with a suitable rest period, the filled containers then being subsequently sealed at a further advanced position, the trays of filled and sealed receptacles being delivered at the other end of the machine for removal.

In the drawings, illustrating such portion of the machine comprising the present improvement, Fig. 1 is a view of the receiving end of the machine in side elevation, partly in section;

Fig. 2 is a transverse sectional view, enlarged and partly broken away, on the line II—II of Fig. 1;

Fig. 3 is a partial plan view of the reciprocable cross head for the cup separating mechanism;

Fig. 4 is a detail sectional view, similar to Fig. 1, enlarged, showing one of the receptacle receiving pockets at the beginning of the rest period below one of the receptacle holders, and with the actuating gear operatively connected;

Fig. 5 is a partial similar view, showing the reciprocable shift bar for the receptacle tray at the limit of its backward movement;

Fig. 6 is a further enlarged sectional detail view of the clutch control mechanism between the constantly running sleeved driving gear and the receptacle detaching mechanism, with the clutch pin withdrawn;

Fig. 7 is a similar view with the clutch pin in driving connection;

Fig. 8 is a partial section on the line VIII—VIII of Fig. 6;

Fig. 9 is a detail view in perspective, showing the clutch pin and its controlling cam;

Fig. 10 is a sectional detail view, showing the operation of automatic disconnection of the clutch pin;

Fig. 11 is a full size cross section on the line XI—XI of Fig. 2, looking upward;

Fig. 12 is a vertical sectional detail view of the cup detaching mechanism on the line XII—XII of Fig. 11, half size, showing the reciprocable cross-head about to lower;

Fig. 13 is a similar view, showing the initial movement as imparted to the lowermost cup, to move it downwardly beyond the resilient supporting abutments;

Fig. 14 is a similar view, showing the detaching mechanism at the limit of its downward movement and the lowermost cup detached and falling below the arrested remaining series of cups;

Fig. 15 is a detail sectional view of one of the resilient holding fingers; and

Fig. 16 is a diagrammatic view in side elevation, showing the cycle movement of the crank and connecting rod mechanism for the reciprocation of the cup detacher.

The machine as a whole, of which the present involved mechanism is a part, is generally rectangular in form, having a horizontal supporting frame 2 of any suitable material, as cast iron, supported upon a convenient pedestal or base. Arranged along each side of the main frame, and forming a part thereof, as shown, are suitable supporting trackways 4—4 for sliding support of the receptacle carrying frame or tray 5. Said tray is adapted to be advanced intermittently along such trackway by the reciprocable bar 6, and engagement thereby of the pawl or spring tongue 7 secured at convenient position on the under side of the cup frame 5. The pawl 7 may be of spring steel, and is adapted to be successively engaged by one of a series of shoulders 8 of bar 6 at the proper time to push the receptacle carrier forward one space, with a certain amount of lost motion at the end of its back stroke and commencement of its forward stroke, providing a desired delay or rest period for the purposes hereinafter described. Such lost motion is indicated at $a$, Fig. 5.

The shoulders 8 are equally spaced so as to ensure accuracy in the periodic intermittent movement of the carrier, or a series of them, by the regularity of motion imparted by bar 6.

The receptacle carrier 5 is generally rectangular in form, of light skeleton construction, and is provided with receptacle receiving pockets or holders 9 set into the upper portion of the carrier, equally spaced longitudinally thereof and also laterally, and preferably arranged in cross rows, whereby to receive a corresponding cross row of receptacles or cups $b$. The holders 9, as shown, are preferably tapered, of the general form of the cups $b$, and have supporting bottoms $d$ either clear across or with an open center, as shown. Such bottom positively supports the cup with a clearance between it and the side of holder 9, so as to prevent sticking.

The longitudinal spacing of such rows or holders equals the distance covered by each forward intermittent movement of the carrier, whereby to bring each successive row of receptacles primarily underneath the cup releasing or charging mechanism, herein involved; as well as to also bring them in the same way subsequently underneath the unit measuring mechanism of the machine (not herein shown, but disclosed in the application above referred to).

The unfilled trays 5 are primarily placed on the extended receiving end of the main frame, as in Fig. 1, with their pockets or holders ready to receive the cups or receptacles, and within the range of the last shoulder 8 of reciprocable bar 6.

The receptacles to be charged into the cavities of holders 9, whereby to fill each transverse row thereof successively, are contained in a corresponding series of magazine tubes 10, arranged across the machine and immediately above a suitable clearance opening for the intermittently traveling tray 5, as shown in Fig. 2. Tubes 10 are of any desired length, and extend upwardly above a cross supporting bar 11 carried at each end upon upright brackets 12—12, mounted upon the side frame members 2—2.

The tubes 10 are preferably of light metal and are equally spaced and fixedly connected so as to correspond with the lateral spacing of the receptacle receiving cavities of the carrier 6, into which the lowermost receptacle of each magazine is to be dropped during the rest period referred to. Each tube 10 is likewise preferably provided with a vertically arranged slot 13 for observation and accessibility to the contained receptacles $b$. These, as shown in Figs. 12–14 inclusive, are of light material, as paper, preferably tapered and of cup shape, although the invention is in no way restricted to any particular form or capacity. The cups as shown are each provided with a terminal shoulder $c$ around their upper edge, for purposes hereinafter described, although they may merely terminate in an ordinary edge of the normal thickness of the cup, if preferred.

Arranged above the supporting bar 11 and in sliding embracing relation to each of the several magazine tubes 10, is the reciprocable cross head 14 having a series of centrally arranged openings 15 corresponding to the position of and providing for clearance around the exterior of each of the several tubes 10. Cross-head 14 is actuated by pitmen 16—16 at each side of the machine connected at 17—17 with terminal actuating cranks 18—18 of operating shaft 19. Pitmen 16 are each preferably provided with an adjusting turnbuckle 20 by which the length of each may be accurately adjusted and the upper member of each pitman is provided with a slotted terminal 21 engaging the terminal stud 22 at each end of the reciprocable cross-head 14.

By this means, said cross-head is intermittently lowered during the rest period of the tray, a certain amount of lost motion being also provided by the slotted terminal 21 in its excess upward movement above the restrained uppermost position of the cross-head in the operation of the machine. Such movement of the cross-head is subject to the vertical guiding control of the embracing engagement with the tubes 10 and also by means of guide stems 23 extending upwardly above brackets 12, through the cross-head 14 at each end portion, and limited by terminal nuts 24.

For the purpose of normally lifting the cross-head 14 and its mechanism up to such uppermost or limited position, it is provided at each end portion with springs 25 resting on each end of cross-bar 11 and surrounding a supplemental guide pin 26, also extending through a guiding pin hole 27 of the cross-head 14 at each end portion.

Each magazine tube 10 is provided at its base with means for supporting a series of nested receptacles or cups $b$ and for successively releasing and positively ejecting the lowermost one of such series for depositing it into the cavity of the receiving holder 9 of the tray, the remaining receptacles falling within the magazine a distance equalling the overlap of such ejected cup. The said mechanism is actuated by vertical reciprocation of cross-head 14. It consists of a series of pushing fingers 28 pivotally connected at 29 to supporting bearings 30 carried by screws 31 in the cross-head 14. Said fingers are arranged around the circular tube forming the base of each magazine occupying generally equi-distant positions, as shown in Fig. 11, so as to engage the upper edge or the laterally extended rim $c$ by the inwardly disposed narrow edge 32 of each finger 28.

For the purpose of effecting such engagement above the edge of the cup or of the rim $c$, each finger is counterweighted by an outward extension 33, whereby to effect an inward swinging tendency at all times with free outward movement for clearance around the next upper rim $c$, on upward movement of cross head 14. The tubular magazine is provided with suitable apertures 34 at corresponding spaces for such clearance. The cups $b$, as stated, may be merely of a continuous uniform thickness clear up to their upper edges, in which case the inner edges of the fingers engage against the upper edge portion of the lower cup in the same manner.

For the purpose of arresting and supporting the lowermost receptacle, and the next upper one when the lowermost one is ejected, I provide a similar series of supporting abutments 35, mounted by spring stems, wire or other suitable material 36, in sockets 37 of cross bar 11, in which sockets the spring arms 36 are secured by adjusting set screws 38. By adjusting set screw 38, the tension of the stem 36 may be accurately controlled so as to locate the inwardly extending rounded abutment 35 at the desired position with relation to the rim $c$. The lower end 39 of spring stem 36 is positively seated in the bottom of the receiving socket which is slightly enlarged at its upper portion, providing for pressure of set screw 38.

Spring stem 36 may be thrust inwardly against the opposite corner 40 of the socket, with sufficient pressure to produce a re-acting outward adjustment of abutment 35, or, by slightly releasing the pressure of the set screw, it may be located further inwardly toward the center, so that the several abutments 35 may be very carefully and accurately located to engage underneath the rim $c$ with the necessary supporting interference. Because of the considerable resiliency of stems 36 and the rounded inner terminals of abutments 35, said abutments will easily swing outwardly when downward movement is imparted to the lowermost cup. When cups are used without the terminal edge $c$, the abutments 35 will engage and release them in the same manner, due to the taper of the cups and the frictional hold of the spring stems 36.

In operation, lowering movement of cross-head 14 will effect such separation by engagement of the several terminals 32 of fingers 28, and when such lowermost cup is thus separated and dropped into the receiver 9 of the tray, as indicated in Fig. 14, the abutments 35 will be forced outwardly and will immediately spring inwardly, engaging the rim of the next receptacle as the entire series falls by gravity, ready for the next operation.

The vertical reciprocation of cross-head 14 is just sufficient to effect the positive disengagement and dropping of each lowermost cup, as in Fig. 13, and the positive retention of the remaining cups. For such purpose, additional abutments 35 are provided around the circumference of the magazine cylinder, at suitable substantially equi-distant locations, as clearly shown in Fig. 11.

Reciprocation of cross head 14 to effect such movement is imparted through pitmen 16 by cranks 18 from shaft 19, as stated. As shown in Fig. 16, the active period of rotation of crank 18 is during its first quarter revolution $x$. During the next quarter revolution $y$, the cross-head 14 is allowed to rise by springs 25, pitmen 16 merely following up with the studs 22. When the cross-head 14 is arrested by the limiting nuts 24, the further movement $z$ of the cranks 18 for the remaining one-half revolution is lost motion, with the slotted terminals 21 rising above and lowering down to the studs 22. There is, therefore, a complete lost motion period of three quarters of a revolution for each cup detachment, during which time the fingers 28 and abutments 35 have ample opportunity for proper engagement with the cup edges.

Said shaft 19 is adapted to be actuated from gear 41 of a train of gears 41, 42, 43, 44, as shown in Fig. 4. Gear 44 of shaft 59 is driven through any suitable transmitting gear from the main shaft of the machine, not shown, and is provided with a crank pin 46 engaging slot 47 of bracket 48 secured to reciprocable bar 6. Shaft 59, running continuously, imparts continuous intermittent reciprocating movement to bar 6, whereby to feed the receptacle tray forward at regular intervals, with the intervening rest period, due to the lost motion above referred to.

Gear 41 is loosely sleeved or journalled on shaft 19, and is adapted to be connected therewith during the time of each cup depositing operation by means of the clutch mechanism shown in detail in Figs. 6–9 inclusive. Gear 41 is provided at one side with a socket 42 for interlocking connection with the terminal 43 of a bolt 44 of hub 45, which in turn is keyed to shaft 19 by key 46. Bolt 44 is normally thrust toward the adjacent face of gear 41 by a spring 47 located in the bolt cavity and bearing outwardly against a retaining plate 48.

Bolt 44, which is either square or splined at its rear portion for guiding purposes within its socket, is provided with an outwardly projecting lug 49. Said lug is adapted to come into engagement with the cam face 50 of arm 51, upon rotation of hub 45, when arm 51 is thrust into its path of movement, as in Figs. 9 and 10.

Arm 51 is secured to a rock shaft 52 carried in suitable bearings in the frame of the machine, and is adapted to be thrust inwardly or outwardly by lever 53, link 54, and lever arm 55. Arm 55 is a portion of a main lever 56 pivoted at 57 to one of the brackets 12 and is provided with a terminal roller 58 extending into the path of one side portion of the tray 5 (see Fig. 2). Arm 51 and its shaft 52 are capable of being assisted so as to more positively throw arm 51 inwardly by a coiled spring 60. Such spring is secured at one end in frame 2 and its other end is secured to an adjusting collar 61 having a set screw 62 for adjustment on shaft 19.

Normally, lever 56 and roller 58 will fall slightly below the level of the side edge portion of the tray, assisted by spring 60, and will thereby thrust arm 51 inwardly within the range of lug 49, effecting disengagement of clutch bolt 43, so as to stop rotation of shaft 19 and render inoperative the reciprocating mechanism for cross-head 14.

Upon the front portion of tray 5 engaging against roller 58, it will raise said roller and lever 56, thrusting link 54 downwardly and throwing cam arm 51 outwardly, as in Fig. 4. Thereupon, as constantly rotating gear 41 brings socket 42 around to registering position with locking bolt 43, it will be thrust into the socket 42, and shaft 19 will be rotated. Thereupon, cross-head 14 will be reciprocated, dropping the lowermost receptacles $b$ for the entire transverse row into the tray cavities, whereupon, the tray will then be moved forwardly one space by actuation of bar 6. During the backward movement of said bar and the rest period incidental to such reverse movement and the lost motion mentioned, cross-head 14 will be again reciprocated, effecting the depositing of a similar series of receptacles in the tray cavities. Such operation will be repeated until all of the transverse cavities of the tray have been filled, and, when the tray passes beyond roller 58, as in Fig. 10, it will drop with lever 56.

Arm 51 will then be thrown inwardly into range of lug 49, effecting disengagement of shaft 19 from gear 41 and discontinuing operation of the receptacle detaching mechanism until roller 58 is again raised by the next oncoming tray. It will be noted that the disengagement of bolt 44 by cam lug 49 and cam face 50 is very gradual and easy, due to the slight slope or angle of the cam face 50.

It will be understood that a series of trays may be located in the manner of a continuous train, with proper spacing of the vertical centers of the receptacle cavity rows, so that a series of trays may be continuously fed inwardly, maintaining continuous elevation of roller 58 without any intervening stoppage, such as occurs between individual or isolated trays.

In Fig. 2, I show an enclosing shield 63 of inverted U-shape, extending upwardly from bar 11 and across the reciprocable crosshead 14 and its parts. By this means, the cup detaching mechanism is completely covered and protected, while the shield may be easily removed upwardly for access to such parts when necessary.

The construction and operation of the machine will be readily understood and appreciated from the foregoing description. It effects a very positive and accurate detachment of the lowermost receptacle from the series of each magazine; each such receptacle is positively dropped and deposited in the receiving holder 9 without binding or sticking, and the receptacles as thus located are definitely and accurately spaced and in proper position for being brought into registering relation with the subsequent filling mechanism.

The invention in this respect is well adapted to the filling of cup holding trays for a machine of the character disclosed in my prior application, or it may be utilized independently for use with any other filling mechanism, as preferred. The special advantages of the invention lie in the certainty of operation and economy of time, while avoiding the necessity of any handling of the receptacles except as may be necessary from time to time in charging the magazine tubes to maintain them filled.

The invention may be variously changed or modified in detail construction or otherwise by the skilled mechanic, or may be amplified as to its dimensions, design, or in other respects for various uses or combinations, but all such changes are to be understood as within the scope of the following claims.

I claim as my invention:

1. In apparatus for charging receptacles into carrying trays provided with means for intermittently advancing a tray, a power shaft, charging mechanism, and a movable member co-operating with the tray and with the power shaft to effect application of power to the charging mechanism; a movable receptacle tray arranged for actuation by said advancing means and adapted to engage and move said movable member to effect such application of power and to discontinue such action upon separation from such member.

2. In apparatus for charging receptacles into carrying trays, the combination of a supporting frame having a trackway, a receptacle tray having longitudinally spaced pockets, means for intermittently moving the tray one space, a superimposed receptacle reservoir, means for detaching a receptacle therefrom for deposit in a registering pocket, and means controlled by the tray for actuating the detaching means.

3. In apparatus for charging receptacles into carrying trays, the combination of a supporting frame having a trackway, a receptacle tray having longitudinally spaced pockets, means for intermittently moving the tray one space, a superimposed receptacle reservoir, reciprocable mechanism for detaching a receptacle for deposit in one of the tray pockets, crank and pitmen mechanism therefor embodying lost motion clearance, a crank shaft, a driving gear therefor, and means for intermittently connecting the crank shaft with the driving gear provided with a lever adapted to be moved by the tray.

4. In apparatus for charging receptacles into carrying trays, the combination of a supporting frame having a trackway, a receptacle tray having longitudinally spaced pockets, means for intermittently moving the tray one space, a superimposed receptacle reservoir, a reciprocable mechanism for detaching a receptacle for deposit in one of the tray pockets, crank and pitmen mechanism therefor embodying lost motion clearance, a crank shaft, a driving gear therefor, a clutch bar for connecting the crank shaft with the driving gear, a controling cam therefor, and a lever connected with the cam having a portion extending within the range of movement of the tray for actuation thereby.

5. In apparatus for charging receptacles into carrying trays, the combination of a supporting frame having a trackway, a receptacle tray having longitudinally spaced pockets, means for intermittently moving the tray one space, a superimposed receptacle reservoir, reciprocable mechanism for detaching a receptacle for deposit in one of the tray pockets, crank and pitmen mechanism therefor embodying lost motion clearance, a crank shaft, a driving gear therefor, a clutch bar for connecting the crank shaft with the driving gear, a controlling cam therefor, and a lever connected with the cam having a portion extending within the range of movement of the tray for actuation thereby, and a regulable spring for assisting return movement of said lever.

6. The combination with a crank shaft and means actuated thereby for detaching a receptacle from a magazine for deposit in a tray pocket, of a driving gear journaled on the crank shaft, a clutch in driving connection with the crank shaft and adapted to engage the driving gear, a retracting cam therefor, a rock shaft for said cam, a lever for actuating the rock shaft having a lifting terminal, and an intermittently actuated receptacle receiving tray adapted to engage said terminal whereby to throw the retracting cam out of the path of the clutch.

7. The combination with a crank shaft and means actuated thereby for detaching a receptacle from a magazine for deposit in a tray pocket, of a driving gear journaled on the crank shaft, a clutch in driving connection with the crank shaft and adapted to engage the driving gear, a retracting cam therefor, a rock shaft for said cam, a lever for actuating the rock shaft having a lifting terminal, a regulable compensating spring adapted to assist the movement of the rock shaft, and an intermittently actuated receptacle receiving tray adapted to engage said terminal whereby to throw the retracting cam out of the path of the clutch.

8. The combination with a receptacle containing magazine, means for detaching the lowermost receptacle therefrom while retaining the remaining upper ones, an actuating shaft therefor, a gear journaled thereon, means controlled by a movable tray for effecting clutch engagement between the shaft and said gear, a movable tray having spaced receptacle receiving pockets and provided with a shifting abutment, a reciprocable shouldered shift bar therefor, and a gear for actuating the shift bar in driving connection with the gear of the actuating shaft of the detaching mechanism.

In testimony whereof I hereunto affix my signature.

CHRISTIAN N. BERGMANN.